United States Patent
Monajemi et al.

(10) Patent No.: US 11,510,260 B2
(45) Date of Patent: Nov. 22, 2022

(54) SIMULTANEOUS TRANSMIT AND RECEIVE CAPABILITY INDICATION METHOD FOR MULTI-LINK DEVICES

(71) Applicant: Cisco Technology, Inc., San Jose, CA (US)

(72) Inventors: Pooya Monajemi, San Francisco, CA (US); Brian Hart, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 158 days.

(21) Appl. No.: 17/001,100

(22) Filed: Aug. 24, 2020

(65) Prior Publication Data

US 2021/0321473 A1    Oct. 14, 2021

Related U.S. Application Data

(60) Provisional application No. 63/009,624, filed on Apr. 14, 2020.

(51) Int. Cl.
| | |
|---|---|
| *H04W 76/15* | (2018.01) |
| *H04W 24/10* | (2009.01) |
| *H04L 1/00* | (2006.01) |
| *H04B 17/318* | (2015.01) |
| *H04B 17/336* | (2015.01) |

(52) U.S. Cl.
CPC .......... *H04W 76/15* (2018.02); *H04B 17/318* (2015.01); *H04B 17/336* (2015.01); *H04L 1/0003* (2013.01); *H04W 24/10* (2013.01)

(58) Field of Classification Search
CPC ..... H04W 76/15; H04W 24/10; H04W 76/16; H04B 17/318; H04B 17/336; H04B 17/101; H04B 1/525; H04L 1/0003
See application file for complete search history.

(56) References Cited

U.S. PATENT DOCUMENTS

| | | |
|---|---|---|
| 9,590,772 B2 | 3/2017 | Choi et al. |
| 10,506,553 B2 | 12/2019 | Ahn et al. |
| 2010/0002618 A1 | 1/2010 | Eichinger et al. |
| 2013/0286819 A1 | 10/2013 | Kim et al. |
| 2017/0001418 A1 | 1/2017 | Cho et al. |

(Continued)

OTHER PUBLICATIONS

Adnan Aijaz et al., "Simultaneous Transmit and Receive Operation in Next Generation IEEE 802.11 WLANs: A MAC Protocol Design Approach", IEEE Wireless Communications, vol. 24, Issue 6, Dec. 2017, 10 pages.

(Continued)

*Primary Examiner* — Walli Z Butt
(74) *Attorney, Agent, or Firm* — Edell, Shapiro & Finnan, LLC

(57) ABSTRACT

A method is performed at a first multilink device configured to communicate wirelessly with a first radio and a second radio of a second multilink device. The method includes accessing a set of parameters for a known mathematical model that establishes a frequency separation to be imposed between transmission from the first radio and reception at the second radio in order to achieve a predetermined reception performance at the second radio when the transmission and the reception are simultaneous. The method further includes, using the known mathematical model, computing the frequency separation based on the set of parameters.

20 Claims, 8 Drawing Sheets

(56) References Cited

U.S. PATENT DOCUMENTS

| | | | |
|---|---|---|---|
| 2017/0257184 A1* | 9/2017 | Stirling-Gallacher | ........................ H04L 1/0026 |
| 2018/0020476 A1 | 1/2018 | Aijaz et al. | |
| 2018/0175997 A1* | 6/2018 | Liu | ........................ H04L 1/0003 |
| 2019/0158263 A1* | 5/2019 | Lee | ........................ H04L 5/0066 |
| 2021/0160804 A1* | 5/2021 | Akkarakaran | .... H04W 72/0413 |
| 2021/0321415 A1* | 10/2021 | Raghavan | ......... H04W 72/0453 |

OTHER PUBLICATIONS

David López-Pérez et al., "IEEE 802.11 be extremely high throughput: The next generation of Wi-Fi technology beyond 802.11 ax.", IEEE Communications Magazine, Sep. 24, 2019, vol. 57, Issue 9, 6 pages.

\* cited by examiner

SIMULTANEOUS TRANSMIT AND RECEIVE CAPABILITY INDICATION METHOD FOR MULTI-LINK DEVICES

CROSS-REFERENCE TO RELATED APPLICATION

This application claims priority to U.S. Provisional Patent Application No. 63/009,624, filed Apr. 14, 2020, incorporated by reference herein in its entirety.

TECHNICAL FIELD

The present disclosure relates to wireless communications and wireless networks.

BACKGROUND

In wireless networks, such as wireless local area networks (WLANs) that use the IEEE 802.11 standard, there is an ever-increasing push to increase throughput and spectral efficiency. A new feature of the IEEE 802.11be standard is multi-link operation (MLO). Multi-link devices (MLDs) are IEEE 802.11 access points and client devices that will, generally, incorporate multiple radios, each radio operating on a different band or frequency channel and maintaining communications with a corresponding radio on an access point (AP) that operates in that band. For example, an MLD may have one radio that supports a first radio link to an AP in the 5 GHz band and another radio that supports a second radio link to the same AP in the 6 GHz band, or two radio links both in the 5 GHz band.

DESCRIPTION OF EXAMPLE EMBODIMENTS

Overview

Figure 1:
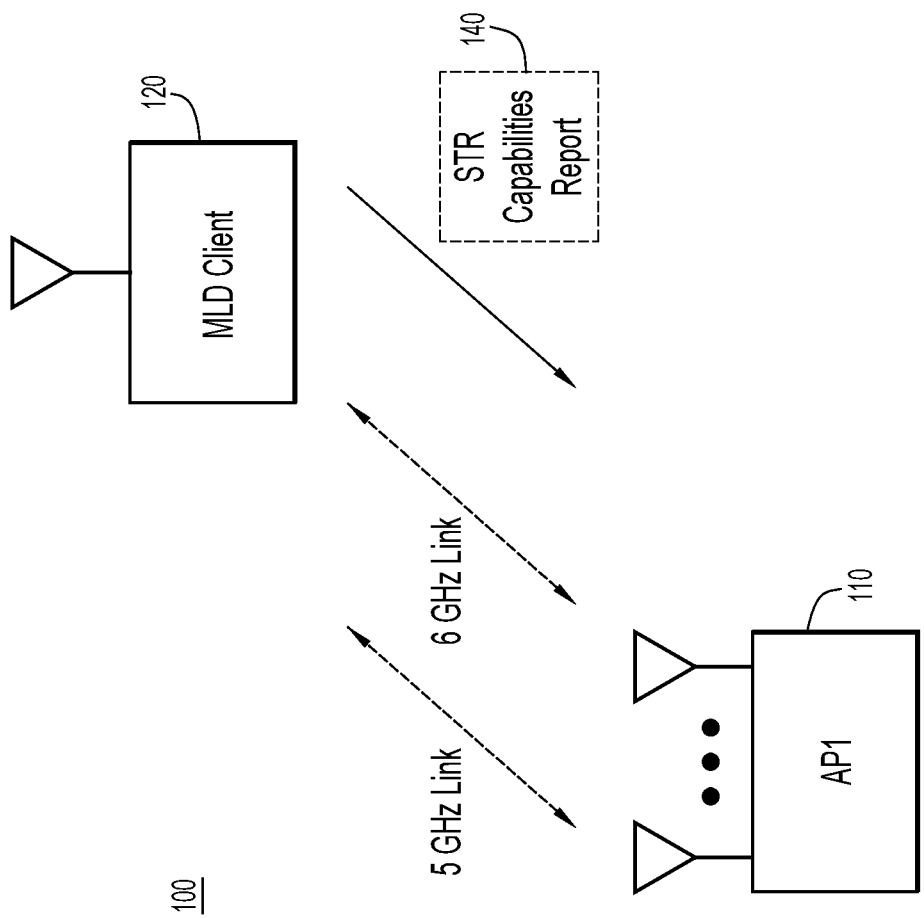
FIG. 1 is a block diagram of wireless network in which simultaneous transmit and receive (STR)-related techniques presented herein may be employed, according to an example embodiment.

A method is performed at a first multilink device configured to communicate wirelessly with a first radio and a second radio of a second multilink device. The method includes accessing a set of parameters for a known mathematical model that establishes a frequency separation to be imposed between transmission from the first radio and reception at the second radio in order to achieve a predetermined reception performance at the second radio when the transmission and the reception are simultaneous. The method further includes, using the known mathematical model, computing the frequency separation based on the set of parameters.

Example Embodiments

Consider an MLD client or station (STA) that includes first and second STA radios integrated into the MLD client (also referred to as a "multilink client device" or a "multi-radio client"). Due to physical proximity of the first and second STA radios on the MLD client, transmission by the first STA radio on a first link is expected to cause interference for reception on a second link associated with the second STA radio, if the two links operate on adjacent frequencies/channels and frequencies/channels that are not far distant from each other. Such interference may cause disruption in the reception of an incoming packet at the second STA on the second link. Simultaneous transmit and receive (STR) operation by the STA, i.e., operation in the "STR mode," may not be guaranteed because such operation assumes successful reception by one STA radio during simultaneous transmission by the other STA radio. "Successful reception" means that a receive signal can be demodulated and decoded successfully/fully. STR operation depends on a number of factors. These factors include frequency/channel separation between the two links operated by the respective STA radios, quality of radio frequency (RF) filtering implemented in the two STA radios, transmission power of the two STA radios, and reception signal strength at the two STA radios.

While the 802.11be task group is attempting to provide methods for non-STR MLD clients to operate smoothly, many complications and inefficiencies arise from a non-STR mode of operation. It is therefore best to attempt to maintain STR operation as much as possible. To that end, a multi-band AP that selects channels to operate on each of the two links should be able to predict whether an MLD client associated with the AP on the two links (i.e., an "associated" MLD client) will be able to operate in STR mode on the two links. This is especially true between the 5 GHz and 6 GHz bands, where the MLD client may be able to operate in STR mode on links in lower 5 GHz and upper 6 GHz bands, but not upper 5 GHz and lower 6 GHz bands, two links both in the 5 GHz band or two links within the 6 GHz band.

It is impractical for the MLD client to report its complete transmit (Tx) power spectral density (PSD), receive (Rx) PSD, receive and transmit filter specifications, dynamic transmit power based on proximity to a user, and so on to the AP, to assist the AP in choosing link frequencies that would enable the MLD client to operate in the STR mode. Accordingly, techniques presented herein include the use of abbreviated reports from the MLD client to the AP in combination with a mathematical model that uses the reports, to assist the AP in choosing appropriate link frequencies to enable the MLD client to operate in the STR mode. In the ensuing description, the terms link frequency; frequency, channel, channel frequency, and frequency channel are synonymous and may be used interchangeably.

Reference is first made to FIG. 1, which shows a wireless network environment 100 in which the methods presented may be employed. The wireless network environment 100 shown is greatly simplified for purposes of describing the embodiments presented herein. The wireless network environment 100 includes an AP 110 (denoted AP1) and an STR MLD client 120. Wireless network environment 100 may also associate and communicate with non-STR MLD clients, not shown in FIG. 1. AP1 includes first and second AP radios configured to operate in first and second frequency bands, e.g., 5 GHz and 6 GHz frequency bands, respectively. The AP radios are configured to operate in their respective frequency bands simultaneously. AP1 selects first and second frequencies/channels in the first and second frequency bands on which the first and second AP radios may operate, and configures the first and second AP radios to operate on those frequencies/channels. The first AP radio may transmit and receive on the first frequency/channel in the first frequency band while the second AP radio may transmit and receive on the second frequency/channel. In this way, AP1 may achieve simultaneous transmit and receive operation. AP1 broadcasts beacon messages that advertise the first and second frequencies/channels on which AP1 has selected to operate.

MLD client 120 includes first and second STA radios configured to operate in the first and second frequency bands, respectively. The first and second STA radios may operate in their respective frequency bands simultaneously. Assuming MLD client 120 associates with AP1, the MLD client 120 configures the first and second STA radios to operate on the first and second frequencies/channels advertised by AP1, respectively. The first STA radio may transmit and receive on the first frequency/channel while the second STA radio may transmit and receive on the second frequency/channel. For example, the first and second STA radios may simultaneously transmit and receive, respectively, or vice versa. While the STR mode operation of MLD client 120 is preferred, it is not assured merely because the first and second STA radios are able to transmit and receive simultaneously on the first and second frequencies/channels, for the reasons listed above.

Accordingly, presented herein are methods to assist AP1 in selecting frequencies for the first and second frequencies/channels that will ensure MLD client 120 is able to operate in the STR mode. More specifically, methods are provided for MLD client 120 to report its capabilities, in an STR capabilities report 140, for STR operation to AP1 in a compact form that is independent of operational parameters of the MLD client. Furthermore, methods are provided for AP1 to compute a minimum required frequency separation between the first and second frequencies/channels based on the reported capabilities and modeled characteristics of a current/typical/expected MLD client population. Further still, methods are presented herein for AP1 to infer the capability information from MLD clients when direct reports are absent or not available.

Reference Set

Figure 2:
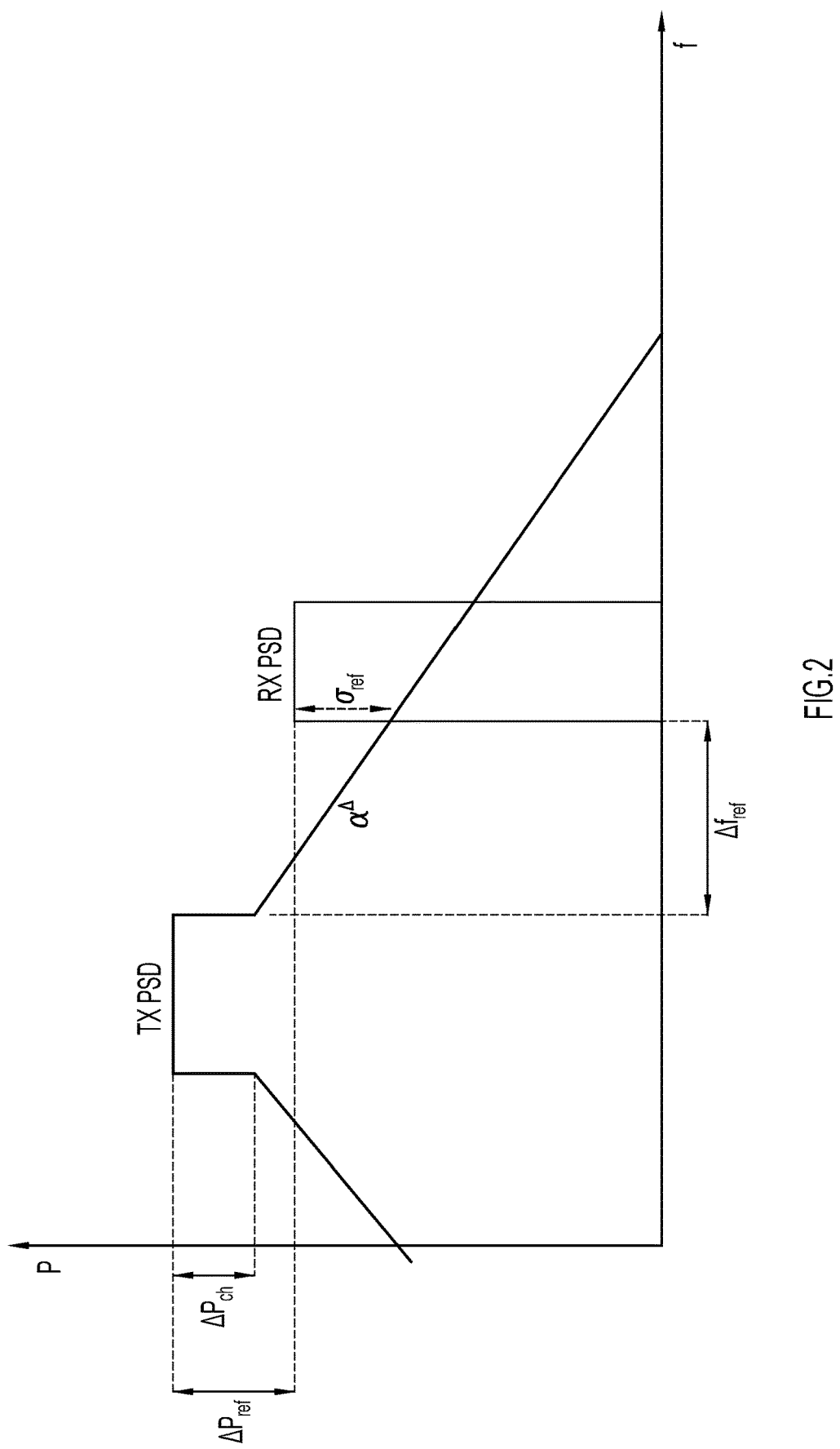
FIG. 2 is a diagram reference transmit (Tx) and receive (Rx) power spectral density (PSD) for an MLD client, which may form the basis of a reference set, according to an example embodiment.

The techniques presented herein establish a predetermined reference set of parameters (referred to simply as a "reference set") that represent baseline capabilities of MLD client 120 with respect to its operation in the STR mode. As will be described below, the reference set represents or equates to a predefined reception performance of, and a signal-to-self interference ratio at, MLD client 120 that enables the MLD client to operate in the STR mode. The reference set is based on predetermined reference PSDs (also referred to as "model" PSDs) for MLD client 120, shown in FIG. 2. With reference to FIG. 2, there is a diagram of a reference Tx PSD of a transmit signal for the first STA radio, and a reference Rx PSD for a receive signal at the second STA radio. The Tx and Rx PSDs are configured with respect to each other to establish the predetermined reception performance that enables MLD client 120 to operate in the STR mode, as described below.

For simplicity, an Rx (frequency) bandwidth of the Rx PSD is assumed to be rectangular. That is, the Rx PSD includes a vertical rising first sideband, a vertical falling second sideband, and a horizontal or level maximum Rx power extending across the Rx bandwidth. On the other hand, the Tx PSD includes a rising-ramp first sideband, a falling-ramp second sideband, and a level maximum Tx power extending over a Tx bandwidth between the first and second sidebands. The rising-ramp first sideband and the falling-ramp second sideband have slopes that rise and fall according to roll-off shapes/slopes of a frequency response of a transmit filter of the second STA radio, i.e., according to transmit filter sideband slopes. More generally, any filtering effects between the receiver and interfering transmitter of MLD client 120 may also be included in this sideband description. As shown, the falling-ramp second sideband of the Tx PSD extends into or overlaps the frequency bandwidth of the Rx PSD, and thus interferes with the Rx PSD as measured by a signal-to-self-interference (SSI) ratio σ. Also for simplicity, the slope of the falling-ramp second sideband is modeled as a linear line, although the slope may also be modeled as a piecewise linear line or other models.

In FIG. 2, the following predetermined parameters shown on the Rx and Tx PSDs represent capabilities of MLD client 120 related to STR operation:

a. $\Delta P_{ref}$: Power difference between the maximum transmit power and the maximum receive power in the reference set.

b. $\Delta f_{ref}$: Frequency separation between the transmit bandwidth and the receive bandwidth (measured edge to edge) in the reference set.

c. $\Delta P_{ch}$: Power difference representing an initial filter fall-off at the edge of the transmit bandwidth.

d. α: Transmit filter roll-off shape/slope once past the transmit bandwidth, also referred as a transmit filter sideband slope parameter.

e. $\sigma_{ref}$: Signal-to-self-interference (SSI) ratio (i.e., a predetermined level of self-interference) at the edge of the receive bandwidth that is established by the parameters $\Delta P_{ref}$, $\Delta f_{ref}$, $\Delta P_{ch}$, and α.

The following additional predetermined parameters that are not shown on the reference PSDs represent further capabilities of MLD client 120:

a. Receiver performance target: In the absence of other sources of interference, and while under an SSI resulting from power difference $\Delta P_{ref}$ between a transmit signal transmitted by the first STA radio and an Rx signal received at the second STA radio of MLD client 120, the MLD client can successfully receive in a modulation coding scheme (MCS) denoted arbitrarily as "X," where X can take on a range of values indicating a range of MCSs. Potentially other parameters, such as number of spatial streams, may also be included in the performance target.

b. Packet error rate (PER) target, media access control (MAC) protocol data unit (MPDU) size, and so on.

As shown in FIG. 2, the reference PSDs establish SSI $\sigma_{ref}$. SSI $\sigma_{ref}$ results in a predetermined reception performance (e.g., which may be the receiver performance target mentioned above) that is sufficient to permit MLD client 120 to operate in the STR mode. Thus, frequency separation $\Delta f_{ref}$ represents a minimum frequency separation that establishes SSI $\sigma_{ref}$ to achieve the predetermined reception performance that enables the STR mode of operation, given power difference $\Delta P_{ref}$ between the transmit and receive signals and with the transmit filter sideband slope $\alpha$. The combination of parameters {receiver performance target, reference power difference $\Delta P_{ref}$, reference frequency difference/separation $\Delta f_{ref}$, transmit filter sideband slope $\alpha$} represent the above-mentioned "reference set" of capabilities of MLD client 120. An alternative reference set excludes the receiver performance target, which is optional.

Additional capabilities may include valid ranges of operation for MLD client 120 in the STR mode, including a valid range of frequency separation and/or power difference between transmit and receive signals. For example, the ranges may be represented as "best case" and "worst case" capabilities indicated by the following predetermined parameters, including (i) "best case" frequency separation that represents a minimum frequency separation below which the MLD device should not operate in the STR mode, and (ii) "worst case" frequency separation that represents a frequency separation above which the MLD device should always operate in the STR mode.

The above-described reference PSDs and their associated parameters may be provided in manufacturer specifications for MLD client 120 and/or agreed in advance between manufactures of AP1 and the MLD client 120. In addition, the parameters may be communicated between AP1 and the MLD client capabilities report(s) 140 over a management channel, for example.

Applying the Reference Set

The PSDs of FIG. 2 and the associated reference set form the basis of a mathematical model that AP1 uses to compute an operating frequency separation to be imposed between transmission from the first STA radio and reception at the second STA radio of MLD client 120, respectively, in order to achieve the predetermined reception performance at the second STA radio even when the transmission and the reception are simultaneous. That is, the mathematical model may be used to compute the frequency separation that ensures that MLD client 120 can operate in the STR mode. Once the frequency separation is computed, AP1 selects, uses, and advertises first and second frequencies/channels, separated by the frequency separation, for communicating with the first and second STA radios of MLD client 120, respectively. MLD client 120 can then operate in the STR mode provided the first and second STA radios use the first and second channels/frequencies, respectively.

Figure 3:
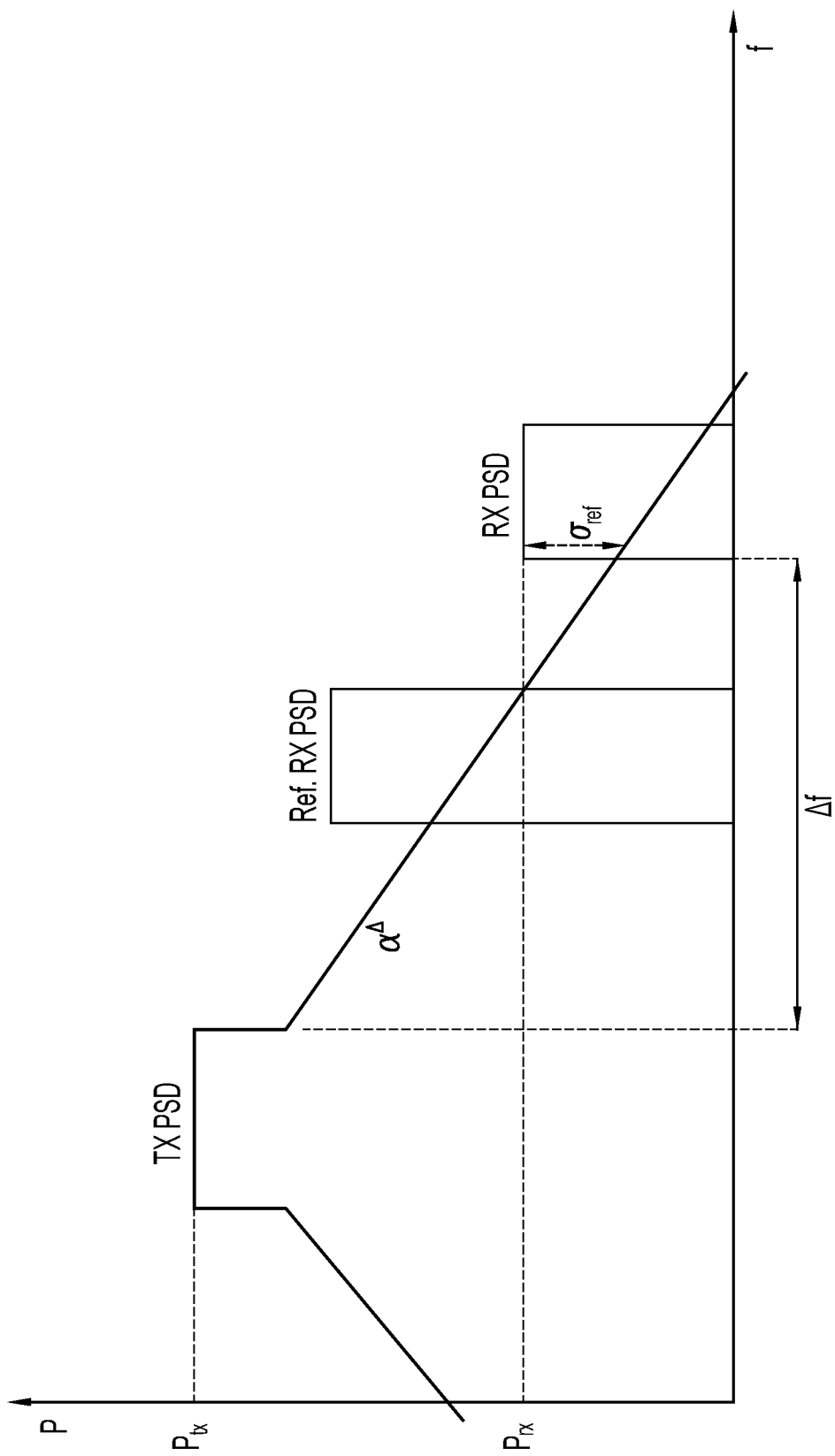
FIG. 3 is a diagram of operating Tx and Rx PSDs for the MLD client, according to an example embodiment.

Derivation of the mathematical model is described below with reference to FIG. 3, and with continued reference to FIG. 2. FIG. 3 shows an example realization of "operating" Tx and Rx PSDs for the first and second STA radios of MLD client 120. The operating PSDs of FIG. 3 may represent amplitude-scaled frequency-shifted versions of the reference PSDs of FIG. 2. The operating Tx and Rx PSDs of FIG. 3 have respective operating transmit powers $P_{tx}$ and $P_{rx}$ (i.e., an operating power difference $\Delta P = P_{tx} - P_{rx}$) and are separated in frequency by an operating frequency separation $\Delta f$. In the example of FIG. 3, the operating Rx PSD is faded relative to the reference set from FIG. 2, such that the receive signal power is smaller than that shown in FIG. 2, which leads to operating power difference $\Delta P$ being larger than reference power difference $\Delta P_{ref}$.

A goal of the mathematical model is to ensure that operating frequency separation $\Delta f$ and operating power difference $\Delta P$ associated with the operating PSDs of FIG. 3 achieve the same SSI (i.e., reference SSI $\sigma_{ref}$) as the reference set, i.e., reference frequency separation $\Delta f_{ref}$ and reference power difference $\Delta P_{ref}$, given the transmit filter sideband slope $\alpha$, which is the same for both scenarios. In other words, the operating tuple ($\Delta f$, $\Delta P$) and the reference tuple ($\Delta f_{ref}$, $\Delta P_{ref}$) should result in the same predetermined reception performance, given transmit filter sideband slope $\alpha$. The mathematical model can be thought of as a translation form the reference tuple to the operating tuple. For simplicity, the value of SSI $\sigma_{ref}$ is evaluated at the same channel edge in both FIGS. 2 and 3.

Based on the above assumptions, calculating $\sigma_{ref}$ once from FIG. 3 and once from FIG. 2, and setting them equal, gives the following equations:

For FIG. 3: $\sigma_{ref} = P_{rx} - (P_{tx} - \Delta P_{ch} - \alpha \cdot \Delta f) = \Delta P_{ch} + \alpha \Delta f + P_{rx} - P_{tx}$, For FIG. 2: $\sigma_{ref} = \Delta P_{ch} + \alpha \cdot \Delta f_{ref} - \Delta P_{ref}$, Set FIG. 3 $\sigma_{ref}$=FIG. 2 $\sigma_{ref}$, Then $\Delta f = \Delta f_{ref} + (P_{tx} - P_{rx} - \Delta P_{ref})/\alpha$     Eq. (1).

The mathematical model represented by Eq. (1) computes frequency separation $\Delta f$ as a minimum frequency separation for STR operation of the MLD client 120, given the reference set and current operating power difference $P_{tx} - P_{rx} = \Delta P$. Assuming AP1 has access to the mathematical model, the reference set, and the current operating power difference $\Delta P$, AP1 computes frequency separation $\Delta f$, selects first and second frequencies/channels, separated by frequency separation $\Delta f$, on which to operate/communicate with first and second STA radios of MLD client 120, and advertises the selected first and second frequencies/channels. More generally, when AP1 associates with multiple MLD clients, AP1 may compute frequency separation $\Delta f$ for each MLD client. AP1 may use $\Delta f$ as follows. AP1 may select a frequency separation to satisfy all current/expected MLD clients, or 95% of current/expected MLD clients, or select a frequency separation that causes up to X % degradation in MCS or throughput across all MLD clients.

For simplicity and generality, the above analysis relies on a characterization of the first and second STA radios as transmitting and receiving radios in the STR mode, respectfully. It is understood, however, that the analysis applies equally to a converse characterization of the first and second STA radios as receiving and transmitting radios in the STR mode, respectively. For example, the converse characterization would simply use Tx and Rx PSDs for the second and first radios, respectively, and generate the reference set to reflect that arrangement.

Cross Link Interference (CLI)

In the embodiment described above, MLD client 120 reports the reference set defined above to AP1, and AP1 computes frequency separation $\Delta f$ based on the reference set and current operating power difference $P_{tx} - P_{rx} = \Delta P$. In another embodiment, AP1 uses a cross link interference (CLI) measured at MLD client 120 as a basis on which to compute frequency separation $\Delta f$. In that case, a receiver of the first STA radio of MLD client 120 measures interference, referred to as the "cross link interference," due to transmission from a transmitter of the second STA radio of the MLD client. The measured CLI is indicative of a power leakage (i.e., leakage power) from the transmitter to the receiver. Then, instead of reporting the full reference set to AP1 as described above, MLD client 120 reports to AP1 the cross link interference in addition to the slope parameters that represent the slope of the transmit filter sideband. The combination of the CLI and the slope parameters transmitted by MLD client 120 to AP1 may be considered an alternative reference set. AP1 computes frequency separation $\Delta f$ based on the CLI and the slope parameters.

Flowcharts

Figure 4:
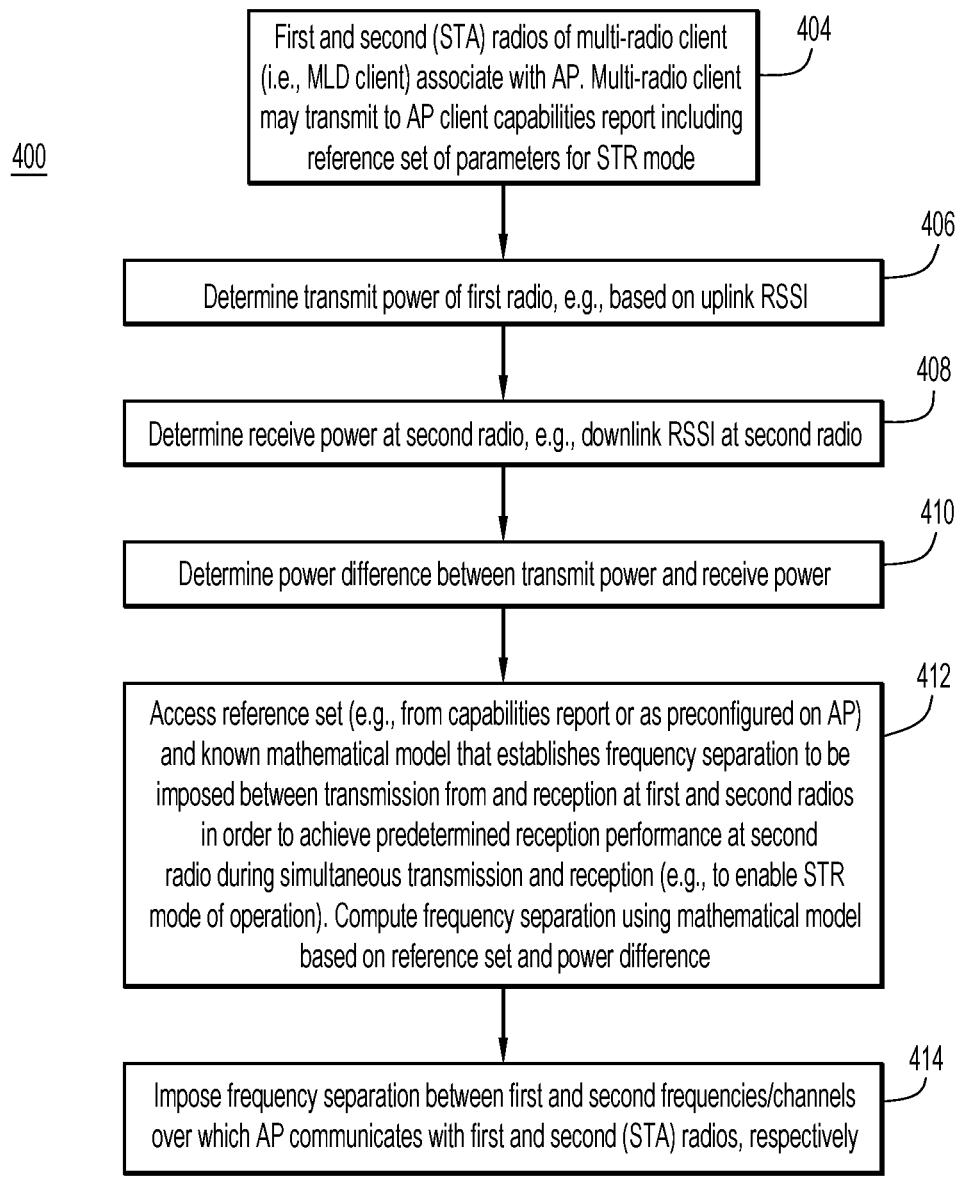
FIG. 4 is a flowchart of an example method of configuring frequencies/channels performed by an access point to ensure the MLD client can operate in an STR mode when using the frequencies/channels, according to an example embodiment.

With reference to FIG. 4, there is a flowchart of an example method 400 of configuring frequencies/channels by AP1 to ensure MLD client 120 (i.e., a multilink client device) can operate in the STR mode when using the frequencies/channels. Method 400 assumes that MLD client 120 is preconfigured with the reference set, and that AP1 is preconfigured with the mathematical model.

At 404, the first and second STA radios of MLD client 120 may each associate with AP1. Then, MLD client 120 sends to AP1 (and AP1 receives) a report of MLD client capabilities (i.e., capabilities report 140), including at least the reference set. In an alternative embodiment in which AP1 is preconfigured with the reference set, the capabilities report may be omitted.

At 406, AP1 determines transmit power $P_{tx}$ of the first STA radio. For example, MLD client 120 may report the transmit power to AP1, which receives the report. When/where transmit power changes with time, AP1 chooses a latest or most current transmit power, a maximum transmit power, or some combination of transmit powers.

At 408 AP1 determines receive power $P_{rx}$ at MLD client 120 that results from transmission from AP1. For example, MLD client 120 may report the receive power to AP1 in a downlink Received Signal Strength Indicator (RSSI) sounding/beacon report. Alternatively, AP1 may use reciprocity for an operating channel between AP1 and MLD client 120, e.g., AP1 measures an uplink RSSI for the MLD client, and adjusts the uplink RSSI for a difference between transmit powers of AP1 and the MLD client.

At 410, AP1 determines power difference $\Delta P$ between the transmit power $P_{tx}$ of the first STA radio and the receive power $P_{rx}$ at the second STA radio of MLD client 120.

At 412, AP1 uses the mathematical model to compute the operating frequency separation $\Delta f$ to be imposed between operating channels/frequencies for the first and second STA radios of MLD client 120 to ensure the STR mode of operation, based on the reference set and power difference $\Delta P$. For operation 412, AP1 may access the reference set as reported by MLD client 120, or AP1 may access the reference set as preconfigured information in memory of AP1.

At 414, AP1 selects first and second frequencies/channels separated by the frequency separation over which to communicate with the first and second STA radios. AP1 advertises the selected frequencies/channels, and communicates with the first and second STA radios using the first and second frequencies/channels, respectively. In other words, AP1 imposes the frequency separation between the first and second frequencies/channels.

In an example of method 400, assume that, after initial association with AP1, the first and second STA radios initially operate with AP1 over initial frequencies/channels $f_1$ and $f_2$, respectively. Also, assume that the frequency separation between the initial frequencies/channels $f_1$ and $f_2$ is less than the frequency separation computed at operation 412, and thus will not support the STR mode of operation at MLD client 120. Then, at operation 414, AP1 may maintain frequency/channel $f_1$ for the first STA radio, but select a new frequency/channel $f_3$ for the second STA radio, such that the frequency separation between frequencies/channels $f_1$ and $f_3$ is equal to or greater than the computed frequency separation.

Figure 5A:
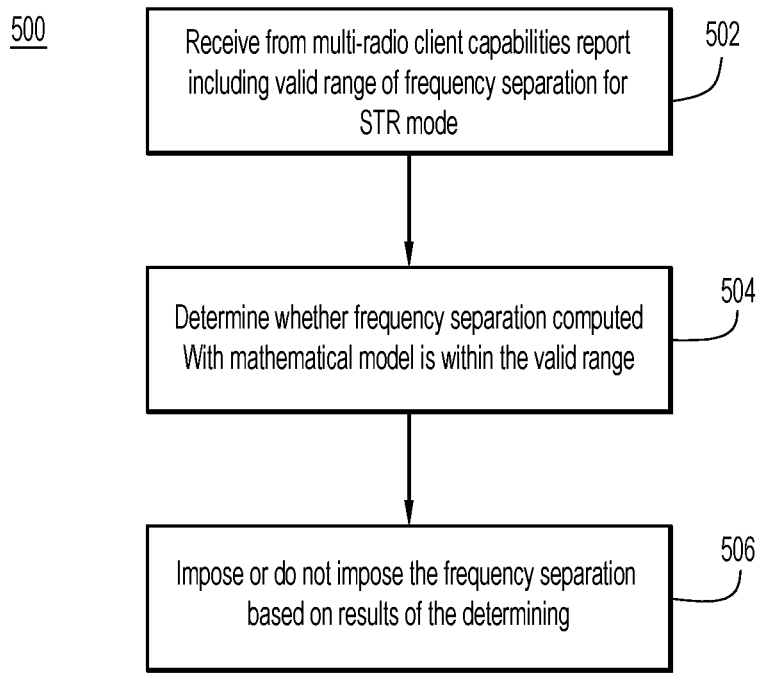
FIG. 5A shows example operations performed by the access point in addition to the operations of the method of FIG. 4, according to an example embodiment.

With reference to FIG. 5A, there are shown example operations 500 for ensuring STR operation of the MLD client over a valid range of frequency separation, performed by the access point, according to an example embodiment.

At 502, AP1 may receive from MLD client 120 a report of additional capabilities of the MLD client. The additional capabilities may indicate a valid range of frequency separation over which MLD device 120 is able to operate in the STR mode, e.g., the report indicates the valid range of frequency separation.

At 504, AP1 determines whether the frequency separation computed at 412 is within the valid range of frequency separation.

At next operations 506 and 508, AP1 imposes the frequency separation based on results of the determining at operation 504, as described below.

At 506, if the computed frequency separation is within the valid range, then AP1 performs operation 414 to impose the computed frequency separation on the operating frequencies/channels.

At 508, if the computed frequency separation is not within the valid range, then AP1 does not performs operation 414, and simply maintains a current operating frequency separation (i.e., maintains the currently operating frequencies/channels).

Figure 5B:
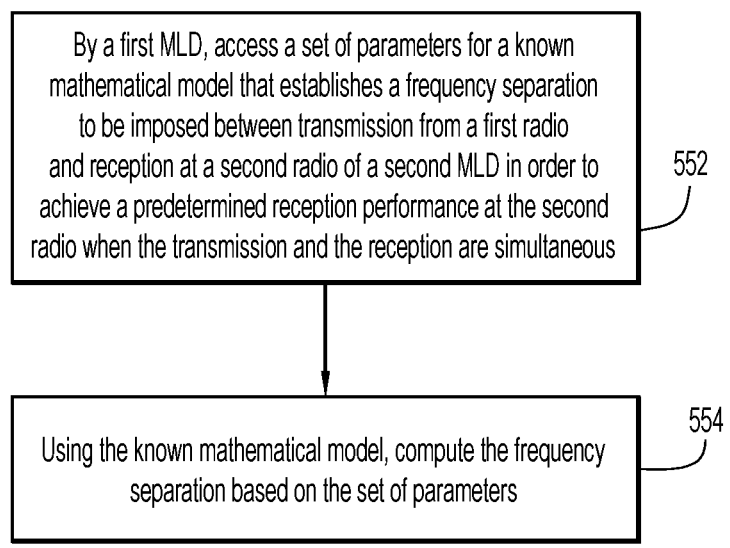
FIG. 5B is a flowchart of an example generalized method of configuring frequencies/channels by a first MLD to ensure that a second MLD can operate in an STR mode when using the frequencies/channels, according to an example embodiment.

By way of example, only, the embodiments presented herein are described in the context of a WiFi® environment in which AP1 communicates with MLD 120. It is understood that the embodiments may operate in a more generalized context in which a first MLD (which may be any MLD not limited to an access point, such as AP1) communicates with a second MLD (which may be any MLD not limited to an MLD client, such as MLD 120) having first and second (STA) radios. With reference to FIG. 5B, there is a flowchart of an example method 550 of configuring frequencies/channels by the first MLD to ensure the second MLD can operate in the STR mode when using the frequencies/channels.

At 552, the first MLD accesses a set of parameters for a known mathematical model that establishes a frequency separation to be imposed between transmission from the first radio and reception at the second radio of the second MLD in order to achieve a predetermined reception performance at the second radio when the transmission and the reception are simultaneous. For example, the first MLD may access the set of parameters using operations 406-410 described above. Alternatively, the first MLD may receive from the second MLD a report of a CLI measured at the second MLD, and may also receive from the second MLD a report of transmit frequency slope parameters.

At 554, using the known mathematical model, the first MLD computes the frequency separation based on the set of parameters, and may impose the frequency separation on the second MLD. The computing may include computing the frequency separation based on at least the measure of the cross link interference.

Adjustments

The mathematical model presented above may be adjusted for multiple factors. Generally, an adjustment results in an increase or a decrease in the frequency separation $\Delta f$ that would otherwise result without the adjustment. First, due to an uncertain nature of a channel, AP1 may subtract a margin from $P_{rx}$ to account for fading. Second, in order to achieve a better target performance at the receiver of one of the STA radios of MLD client 120, an MCS improvement offset may be added to the $\sigma_{ref}$ calculation from FIG. 3. Any known or hereafter developed method used to calculate the offset may be used. Alternately, a different reference set may be reported by the device for each MCS target. Further still, alternatively, given a frequency separation, the AP may calculate a predicted MCS and/or throughput with the client during STR. Several specific adjustments are described in further detail below.

Piecewise-Linear Modeling

Figure 6:
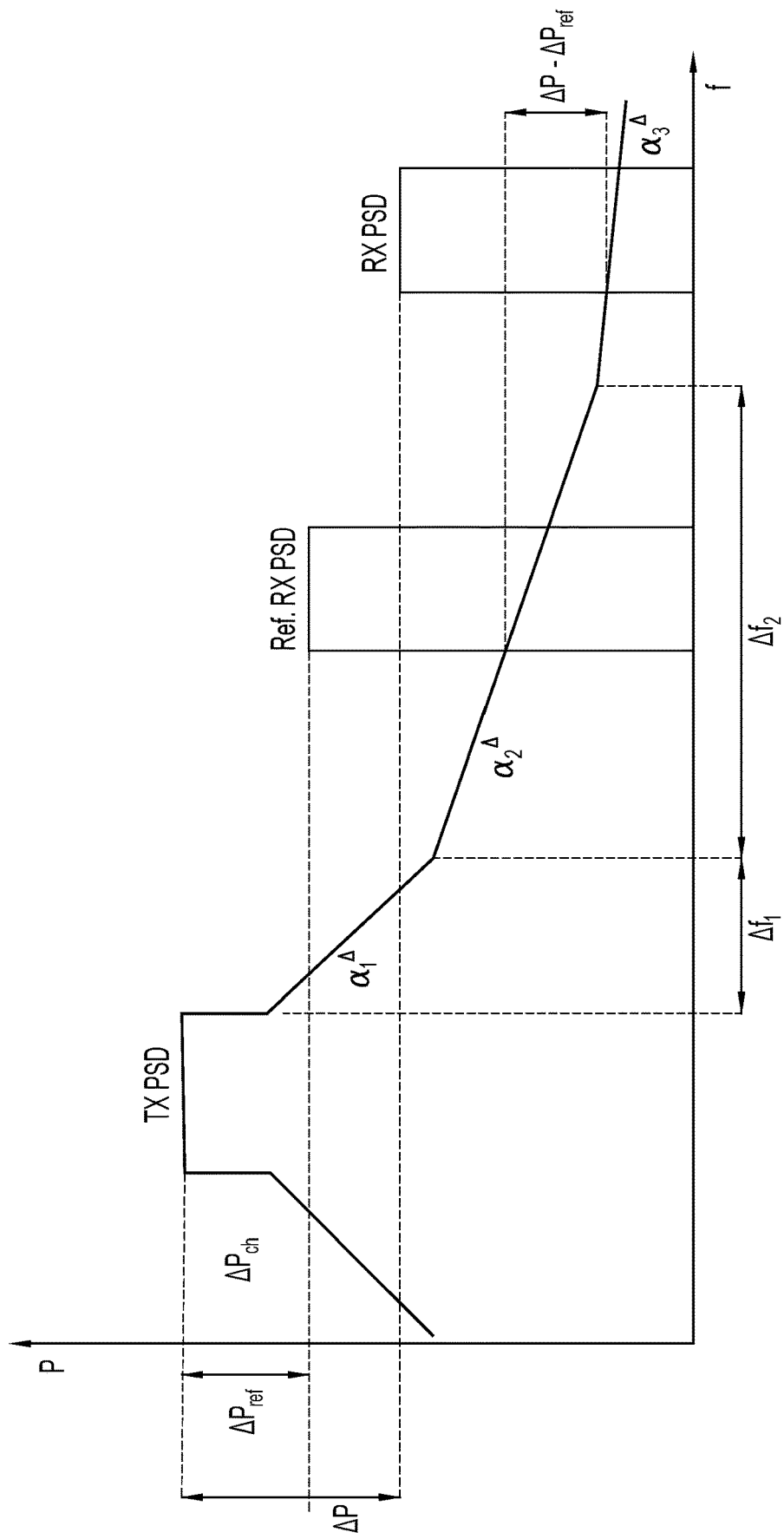
FIG. 6 is a diagram of a piecewise-linear transmit filter model used to determine a frequency separation for STR operation of the MLD client, according to an example embodiment.

As mentioned above, the transmit filter sideband slope may be modeled as a piecewise linear line rather than a simple linear line. With reference to FIG. 6, there is shown an example reference Tx PSD in which the transmit filter sideband slope (i.e., frequency response) follows a piecewise linear model. In this case, MLD client 120 reports to AP1 a number of pairs of $(\Delta f_n, \alpha_n)$ values in capabilities report(s) 140 to describe the transit filter sideband slope. Using the reported pairs $(\Delta f_n, \alpha_n)$, AP1 computes the minimum frequency separation $\Delta f$ for the piecewise linear model as a straightforward extension of the single line model $(\Delta f, \alpha)$ used in the mathematical model of Eq. (1). An example of the extended computation is provided below.

Find the line segment index $N_{ref}$ on which the reference $\Delta f_{ref}$ falls:

$$N_{ref} = \min_N \left\{ \sum_{n=1}^{N} (\Delta f_n) > \Delta f_{ref} \right\}.$$

Let the transmit power difference associated with each line segment be denoted by $\Delta P_n$:

$$\Delta P_n = \Delta f_n \alpha_n.$$

Find the line segment index $N_{rx}$ on which the received Rx power level falls by comparing $\Delta P_{ref}$ and $\Delta P$:

$$\Delta P > \Delta P_{ref}: N_{rx} =$$

$$N_{ref} + \min_N \left\{ \left( \sum_{n=1}^{N_{ref}} (\Delta f_n) - \Delta f_{ref} \right) \alpha_{N_{ref}} + \sum_{n=1}^{N} (\Delta P_{N_{ref}+n}) > \Delta P - \Delta P_{ref} \right\}.$$

$$\Delta P < \Delta P_{ref}: N_{rx} =$$

$$N_{ref} - \min_N \left\{ \left( \Delta f_{ref} - \sum_{n=1}^{N_{ref}-1} (\Delta f_n) \right) \alpha_{N_{ref}} + \sum_{n=1}^{N} (\Delta P_{N_{ref}-n}) > \Delta P_{ref} - \Delta P \right\}.$$

Now, similarly to the linear model, $\sigma_{ref}$ is set equal from each PSD, and the resulting equations are solved for $\Delta f$.

Ref PSD: $\sigma_{ref} = \Delta P_{ch} + \sum_{n=1}^{N_{ref}-1}(\alpha_n \cdot \Delta f_n) + \alpha_{N_{ref}} \cdot (\Delta f_{ref} - \sum_{n=1}^{N_{ref}-1} \Delta f_n) - \Delta P_{ref}$ Rx PSD: $\sigma_{ref} = \Delta P_{ch} + \sum_{n=1}^{N_{rx}-1}(\alpha_n \cdot \Delta f_n) + \alpha_{N_{rx}} \cdot (\Delta f - \sum_{n=1}^{N_{rx}-1} \Delta f_n) - \Delta P$ Thus, $\Delta f$ is given by:

$$\sum_{n=1}^{N_{rx}-1} \Delta f_n + \frac{\sum_{n=1}^{N_{ref}-1}(\alpha_n \cdot \Delta f_n) - \sum_{n=1}^{N_{rx}-1}(\alpha_n \cdot \Delta f_n) + \alpha_{N_{ref}} \cdot \left(\Delta f_{ref} - \sum_{n=1}^{N_{ref}-1} \Delta f_n\right) + \Delta P - \Delta P_{ref}}{\alpha_{N_{rx}}}$$

Lower and Upper Bounding

Characteristics of MLD client 120 and interactions between the MLD client and AP1 may vary for multiple reasons, including variations in hardware characteristics based on frequency, and so on, dynamic changes in a mode of operation and hardware, and the presence of other factors such as non-WiFi technologies coexisting with WiFi. Accordingly, MLD client 120 may adjust its capabilities reports to account for such variations in multiple ways. For example, MLD client 120 may report best case and worst-case conditions, as mentioned above. MLD client 120 may also update the capabilities report every time the MLD client modifies its operation mode or hardware. Also, MLD client 120 may transmit a signal to indicate which type of report is included from the above cases.

MCS/Number of Spatial Streams (Nss) Considerations

A given radio receiver of MLD client 120 may face limitations in the MCS/Nss pairs that it can receive due to leakage interference. A smaller amount of leakage power may allow the receiver device to receive at higher MCS or Nss values. Accordingly, the capabilities report transmitted by MDL client 120 to AP1 may:

a. May indicate or agree in advance to an MCS/Nss pair for which the report is being given.
b. Be transmitted multiple times for a number of MCS/Nss values.
c. Be transmitted along with a guidance on how to adjust the mathematical model for various MCS/Nss pairs.

Upon receiving a capabilities report from MLD client 120 that includes the above-listed MCS/Nss information, AP1 may:

a. Modify the computed frequency separation, e.g., add margins to the computed frequency separation that allow any target MCS/Nss values to achieve STR operation. In an example, AP1 may store a look-up table that lists MCS/Nss values mapped to corresponding margin values to be added to or subtracted from frequency separations computed using the mathematical model based on the reference set also reported in the capabilities report(s).
b. Compute MCS/Nss capabilities of associated STA radios based on a pair of selected frequencies/channels.
c. Decide to switch frequencies/channels to allow higher values of MCS/Nss.
d. Limit the MCS/Nss values are used when transmitting to the STA radios.

Asymmetric and Band Specific Performance

MLD client 120 may have varying behavior depending on the frequency or frequency range (band) of operation. The hardware of MLD client 120 may have frequency-dependent characteristics, and the MLD client may use different hardware for each frequency rage/band. Accordingly, to account for such variations, MLD client 120 may transmit its capabilities report multiple times to indicate the varying capabilities. For example, once for the first STA radio transmitting and once for the second STA radio receiving, and once vice versa.

Implicit Interference of Client Capabilities

Qualities of filtering and receiver performance are, to a large extent, intrinsic to hardware and expected to be common among MLD clients that use the same hardware. An AP or an AP manufacturer may collect data over time from MLD clients that operate in STR mode and analyze this data to infer under which conditions the MLD clients are STR capable. The set of data to collect may include device manufacturer and model, channel separation when STR is observed, MCS supported during periods of STR operation, uplink RSSIs during periods of STR (MLD client may back off from its highest transmit power in order to maintain receive capability), downlink transmission powers (from the associated AP) during periods of STR. A value of transmit filter sideband slope $\alpha$ may be inferred by fitting a linear model to a set of data collected from the device.

These techniques may be expanded for use all the way up to a wireless local area network controller/AP, based on long-term client STR measurements and reports, and the characteristics of the current client set. Also based on general goals, a new channel spacing may be selected if useful to do so.

STR Capabilities Report

The following table lists information/fields that may be provided in an STR capabilities report transmitted by an MLD client to AP1. The STR capabilities report may contain all or a subset of the fields listed in the table.

Figure 7:
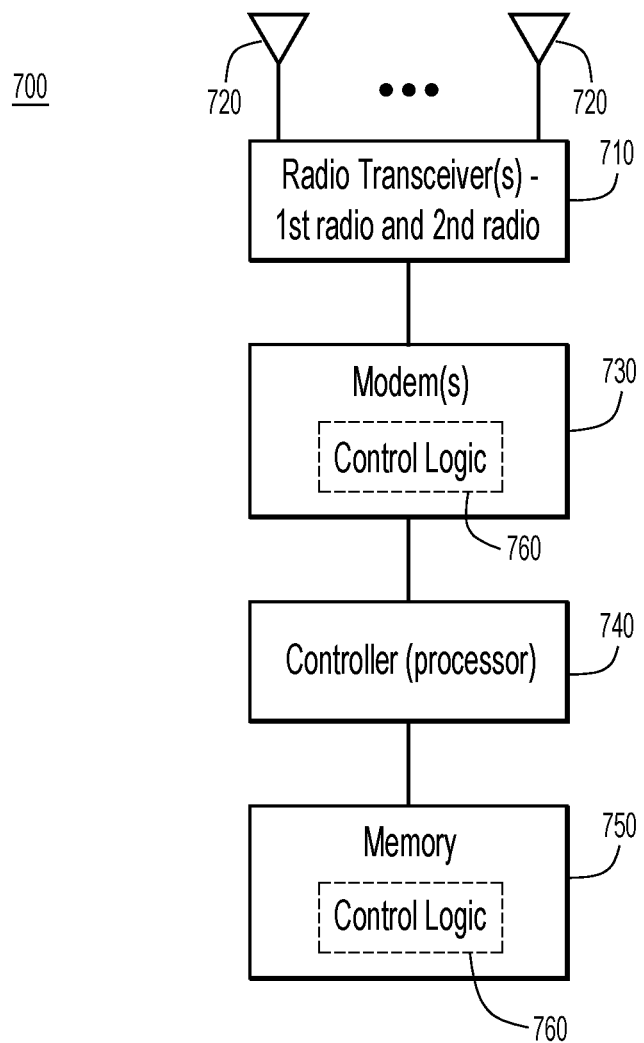
FIG. 7 is a block diagram of a wireless device representative of the access point and the MLD client that may be configured to perform the operations presented herein, according to an example embodiment.

MLD client identifier(s) (e.g., MAC addresses, IP addresses)
STR capable flag yes/no
$\Delta P_{ref}$
$(\Delta f_{ref}, \alpha)$ or $(\Delta f_n, \alpha_n)$ values)
Valid Range for $\Delta f$
MCS/Nss in use
Predefined Reception Performance,
$\sigma_{ref}$
Adjustment margin for $\Delta f$
CLI Reference is now made to FIG. 7, which shows a block diagram of a wireless multilink device 700 (AP or client device) configured perform the operations presented herein. The wireless device includes 700 includes one or more radio transmitter-receivers (transceivers) 710. For an AP, the one or more radio transceivers include multiple radio transceivers. For an MLD client, the one or more radio transceivers include at least first and second STA radio transceivers representing the first and second STA radios described above. Wireless device 700 also includes multiple antennas 720 coupled to the one or more radio transceivers, one or more modems 730 coupled to the one or more transceivers, a controller (e.g., a microprocessor) 740 coupled to the modems, and memory 750 coupled to the controller(s). The modem 730 may be configured with control logic 760 to control operation of the wireless device 700 in accordance with the operations described herein. Alternatively, the memory 750 may store software instructions for control logic 760 that, when executed by the controller 740, causes the controller 740 to execute the operations described herein.

The memory 750 may comprise read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller 740) it is operable to perform the operations described herein.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, a method is presented for compactly reporting STR capabilities of an MLD client and applying the reported capabilities in computing a required minimum frequency separation between frequencies/channels on which to communicate with the MLD client. In addition, a method is presented for implicitly inferring these capabilities when the client report is not present.

In one aspect, a method is provided comprising: at a first multilink device configured to communicate wirelessly with a first radio and a second radio of a second multilink device: accessing a set of parameters for a known mathematical model that establishes a frequency separation to be imposed between transmission from the first radio and reception at the second radio in order to achieve a predetermined reception performance at the second radio when the transmission and the reception are simultaneous; and using the known mathematical model, computing the frequency separation based on the set of parameters.

In another aspect, an apparatus is provided comprising: multiple radios of a first multilink device to communicate wireless wirelessly with a first radio and a second radio of a second multilink device; and a processor coupled to the multiple radios and configured to perform: accessing a set of parameters for a known mathematical model that establishes a frequency separation to be imposed between transmission from the first radio and reception at the second radio in order to achieve a predetermined reception performance at the second radio when the transmission and the reception are simultaneous; and using the known mathematical model, computing the frequency separation based on the set of parameters.

In yet another aspect, a non-transitory compute readable medium is provided. The medium is encoded with instructions that, when executed by a processor of a first multilink device configured to communicate wirelessly with a first radio and a second radio of a second multilink device, cause the processor to perform: accessing a set of parameters for a known mathematical model that establishes a frequency separation to be imposed between transmission from the first radio and reception at the second radio in order to achieve a predetermined reception performance at the second radio when the transmission and the reception are simultaneous; and using the known mathematical model, computing the frequency separation based on the set of parameters.

In a further aspect, a method is provided comprising: at an access point configured to communicate wirelessly with a first radio and a second radio of a multilink client device: determining a power difference between a transmit power of the first radio and a receive power at the second radio that results when the access point transmits to the second radio; accessing a reference set of parameters for a known mathematical model that establishes a frequency separation to be imposed between transmission from the first radio and reception at the second radio in order to achieve a predetermined reception performance at the second radio when the transmission and the reception are simultaneous; using the known mathematical model, computing the frequency separation based on the reference set of parameters and the power difference; and imposing the frequency separation between first and second frequencies over which the access point communicates with the first radio and the second radio, respectively.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a first multilink device configured to communicate wirelessly with a first radio and a second radio of a second multilink device:
   determining a power difference between a transmit power of the first radio and a receive power at the second radio when the first multilink device transmits to the second radio;
   accessing a reference set of parameters for a known mathematical model based on reference power spectral densities for the first radio and the second radio that are configured by the reference set of parameters to establish a frequency separation to be imposed between transmission from the first radio and reception at the second radio given the power difference in order to achieve a predetermined reception performance at the second radio when the transmission and the reception are simultaneous; and
   using the known mathematical model, computing the frequency separation based on the reference set of parameters and the power difference.

2. The method of claim 1, wherein the predetermined reception performance enables the second multilink device to operate in a simultaneous transmit and receive (STR) mode via the first radio and the second radio.

3. The method of claim 2, wherein:
   the first multilink device and the second multilink device are configured to operate in accordance with an Institute of Electrical and Electronics Engineers (IEEE) 805.11 standard.

4. The method of claim 1, wherein the known mathematical model is based on a reference transmit power spectral density (PSD) for the first radio and a reference receive PSD for the second radio that are configured as a function of the reference set of parameters to establish a predetermined level of self-interference that results in the predetermined reception performance.

5. The method of claim 4, wherein the reference set of parameters include a reference frequency separation and a reference power difference between the reference transmit PSD and the reference receive PSD that result in the predetermined level of self-interference.

6. The method of claim 5, wherein computing includes translating the reference frequency separation and the reference power difference to the frequency separation based on the power difference.

7. The method of claim 4, wherein the reference transmit PSD includes a transmit filter sideband that overlaps the reference receive PSD, and the reference set of parameters include one or more slope parameters that represent a slope of the transmit filter sideband.

8. The method of claim 7, wherein the slope is linear or piecewise linear.

9. The method of claim 1, wherein the first multilink device includes an access point and the second multilink device includes a multilink client device.

10. The method of claim 1, further comprising, at the first multilink device:
    determining a modulation and coding scheme (MCS) for the second multilink device; and
    modifying the frequency separation based on the MCS.

11. The method of claim 1, further comprising, at the first multilink device:
imposing the frequency separation between first and second frequencies over which the first multilink device communicates with the first radio and the second radio, respectively.

12. The method of claim 11, further comprising, at the first multilink device:
receiving from the second multilink device a report that indicates a valid range of frequency separation;
determining whether the frequency separation is within the valid range of frequency separation; and
imposing the frequency separation based on results of determining whether the frequency separation is within the valid range of frequency separation.

13. The method of claim 12, wherein imposing the frequency separation based on determining includes imposing or not imposing the frequency separation when the frequency separation is within or not within the valid range of frequency separation, respectively.

14. The method of claim 1, wherein:
accessing the reference set of parameters includes receiving from the second multilink device a measure of a cross link interference between the transmission from the first radio and the reception at the second radio; and
computing includes computing the frequency separation based on at least the measure of the cross link interference.

15. An apparatus comprising:
multiple radios of a first multilink device to communicate wireless wirelessly with a first radio and a second radio of a second multilink device; and
a processor coupled to the multiple radios and configured to perform:
determining a power difference between a transmit power of the first radio and a receive power at the second radio when the first multilink device transmits to the second radio;
accessing a reference set of parameters for a known mathematical model based on reference power spectral densities for the first radio and the second radio that are configured by the reference set of parameters to establish a frequency separation to be imposed between transmission from the first radio and reception at the second radio given the power difference in order to achieve a predetermined reception performance at the second radio when the transmission and the reception are simultaneous; and
using the known mathematical model, computing the frequency separation based on the reference set of parameters and the power difference.

16. The apparatus of claim 15, wherein the predetermined reception performance enables the second multilink device to operate in a simultaneous transmit and receive (STR) mode via the first radio and the second radio.

17. The apparatus of claim 15, wherein the processor is further configured to perform, at the first multilink device:
determining a modulation and coding scheme (MCS) for the second multilink device; and
modifying the frequency separation based on the MCS.

18. A non-transitory computer readable medium encoded with instructions that, when executed by a processor of a first multilink device configured to communicate wirelessly with a first radio and a second radio of a second multilink device, cause the processor to perform:
determining a power difference between a transmit power of the first radio and a receive power at the second radio when the first multilink device transmits to the second radio;
accessing a reference set of parameters for a known mathematical model based on reference power spectral densities for the first radio and the second radio that are configured by the reference set of parameters to establish a frequency separation to be imposed between transmission from the first radio and reception at the second radio given the power difference in order to achieve a predetermined reception performance at the second radio when the transmission and the reception are simultaneous; and
using the known mathematical model, computing the frequency separation based on the reference set of parameters and the power difference.

19. The non-transitory computer readable medium of claim 18, wherein the predetermined reception performance enables the second multilink device to operate in a simultaneous transmit and receive (STR) mode via the first radio and the second radio.

20. The non-transitory computer readable medium of claim 18, further comprising instructions to cause the processor to perform, at the first multilink device:
determining a modulation and coding scheme (MCS) for the second multilink device; and
modifying the frequency separation based on the MCS.

* * * * *

UNITED STATES PATENT AND TRADEMARK OFFICE
CERTIFICATE OF CORRECTION

PATENT NO. : 11,510,260 B2
APPLICATION NO. : 17/001100
DATED : November 22, 2022
INVENTOR(S) : Pooya Monajemi et al.

It is certified that error appears in the above-identified patent and that said Letters Patent is hereby corrected as shown below:

In the Claims

Claim 3, Column 16, Line 36, please replace "805.11 standard" with --802.11 standard--

Signed and Sealed this
Seventh Day of March, 2023

Katherine Kelly Vidal
*Director of the United States Patent and Trademark Office*